United States Patent
Colegrove et al.

(10) Patent No.: US 7,986,480 B2
(45) Date of Patent: Jul. 26, 2011

(54) MICRO-JOURNALING OF DATA ON A STORAGE DEVICE

(75) Inventors: Daniel J. Colegrove, Henderson, NV (US); Richard M. H. New, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 342 days.

(21) Appl. No.: 11/265,826

(22) Filed: Nov. 3, 2005

(65) Prior Publication Data

US 2007/0097535 A1 May 3, 2007

(51) Int. Cl.
*G11B 5/09* (2006.01)
*G06F 13/00* (2006.01)

(52) U.S. Cl. ............. 360/53; 360/31; 711/161

(58) Field of Classification Search .............. None
See application file for complete search history.

(56) References Cited

U.S. PATENT DOCUMENTS

| | | | |
|---|---|---|---|
| 4,507,751 A | | 3/1985 | Gawlick et al. |
| 5,195,100 A | | 3/1993 | Katz et al. |
| 5,255,270 A | | 10/1993 | Yanai et al. |
| 5,341,493 A | | 8/1994 | Yanai et al. |
| 5,454,103 A | | 9/1995 | Coverston et al. |
| 5,463,758 A | * | 10/1995 | Ottesen ............... 711/114 |
| 5,499,147 A | * | 3/1996 | Tsai et al. ............ 360/53 |
| 5,499,337 A | | 3/1996 | Gordon |
| 5,799,200 A | * | 8/1998 | Brant et al. ............ 713/340 |
| 5,813,025 A | * | 9/1998 | Murphy et al. ............ 711/114 |
| 5,835,955 A | * | 11/1998 | Dornier et al. ............ 711/162 |
| 5,991,774 A | * | 11/1999 | Tate et al. ............ 707/203 |
| 6,043,945 A | * | 3/2000 | Tsuboi et al. ............ 360/53 |
| 6,191,712 B1 | | 2/2001 | Still |
| 6,205,526 B1 | * | 3/2001 | Tanuma ............ 711/162 |
| 6,311,240 B1 | * | 10/2001 | Boone et al. ............ 710/74 |
| 6,343,343 B1 | | 1/2002 | Menon et al. |
| 6,412,042 B1 | * | 6/2002 | Paterson et al. ............ 711/112 |
| 6,457,096 B1 | * | 9/2002 | Ageishi et al. ............ 711/112 |
| 6,625,703 B2 | * | 9/2003 | Goodman et al. ............ 711/162 |
| 6,654,193 B1 | * | 11/2003 | Thelin ............ 360/53 |
| 6,658,592 B1 | * | 12/2003 | Cohen et al. ............ 714/6.1 |
| 6,728,060 B1 | * | 4/2004 | Chng et al. ............ 360/77.01 |
| 6,769,088 B1 | * | 7/2004 | Weng ............ 714/766 |
| 6,907,506 B2 | * | 6/2005 | Proidl ............ 711/162 |
| 6,924,952 B1 | * | 8/2005 | Brunnett et al. ............ 360/48 |
| 6,978,345 B2 | * | 12/2005 | Tomaszewski et al. ....... 711/112 |
| 6,988,178 B1 | * | 1/2006 | Shirai et al. ............ 711/200 |
| 7,099,993 B2 | * | 8/2006 | Keeler ............ 711/113 |
| 7,167,961 B2 | * | 1/2007 | Yeo ............ 711/162 |

(Continued)

FOREIGN PATENT DOCUMENTS

JP 58103052 6/1983

(Continued)

*Primary Examiner* — Dismery E Mercedes (57) ABSTRACT

Embodiments of the present invention recite a method of preserving data on a hard disk drive. In one embodiment, a first copy of data is read from at least one sector of a hard disk drive and stored in a first location. A second copy of the data is stored in a non-volatile memory location of the hard disk drive. The first copy of the data is then modified to create a modified copy. The second copy of the data is then used to verify that the modified copy of data has been correctly written to the at least one sector of the hard disk drive.

14 Claims, 5 Drawing Sheets

U.S. PATENT DOCUMENTS

| | | | |
|---|---|---|---|
| 7,231,564 B2 * | 6/2007 | Loaiza et al. | 714/723 |
| 7,260,695 B2 * | 8/2007 | Batchelor et al. | 711/161 |
| 2002/0007433 A1 | 1/2002 | Kusakabe et al. | |
| 2005/0120063 A1 * | 6/2005 | Koestler | 707/204 |
| 2006/0048002 A1 * | 3/2006 | Kodi et al. | 714/13 |
| 2006/0080515 A1 * | 4/2006 | Spiers et al. | 711/162 |
| 2006/0184736 A1 * | 8/2006 | Benhase et al. | 711/118 |

FOREIGN PATENT DOCUMENTS

| | | |
|---|---|---|
| JP | 1191246 | 8/1989 |
| JP | 6139122 | 5/1994 |
| JP | 6139123 | 5/1994 |
| JP | 6332808 | 12/1994 |
| JP | 2001202200 | 7/2001 |
| JP | 2001249855 | 9/2001 |

* cited by examiner

MICRO-JOURNALING OF DATA ON A STORAGE DEVICE

FIELD OF THE INVENTION

Embodiments of the present invention are related to the field of data storage.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

In the past, sectors of 512 bytes were the smallest individual storage units available on a hard disk drive. However, as the capacity of hard disk drives has grown, it has become increasingly inefficient to implement storage in 512 byte sectors. As a result, recent trends in hard disk drive technology have implemented larger sectors (e.g., 4096 bytes). However, the file systems of older operating systems may not be compatible with these larger sectors. Thus, to be backward compatible with these older file systems, the larger sectors are divided into "logical blocks" of 512 bytes.

Because the sector is the smallest individual unit to which data can be written to, the newer hard disk drives are limited to writing an entire 4096 byte sector, even if less than the entire 4096 byte capacity of the sector is being modified. Thus, when working with older file systems, when one logical block is being modified, the entire sector is read into memory, the data in one or more logical blocks is modified, and the data is re-written over the original data in that sector. Typically, this process is managed transparently by the hard disk drive so that the hard disk drive appears, to the host system, to be composed of 512 byte sectors.

However, this opens a potential data integrity problem if the re-write operation is not completed due to, for example, a sudden power loss of the host system. More specifically, if only part of the original data in the sector has been overwritten prior to the power loss, the entire sector is invalid and the original data in the sector may be irretrievably lost. Additionally, there may be no way to determine that the original data was affected by the power loss. This is particularly problematic in an unaligned write operation (e.g., a write operation in which only a portion of the original data is being overwritten).

While current systems provide for the recovery of data when the data being written to a sector comprises entirely new data (e.g., an aligned write operation), they do not provide data recovery in an unaligned write operation.

SUMMARY OF THE INVENTION

Embodiments of the present invention recite a method of preserving data on a hard disk drive. In one embodiment, a first copy of data is read from at least one sector of a hard disk drive and stored in a first location. A second copy of the data is stored in a non-volatile memory location of the hard disk drive. The first copy of the data is then modified to create a modified copy. The second copy of the data is then used to verify that the modified copy of data has been correctly written to the at least one sector of the hard disk drive.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1A:
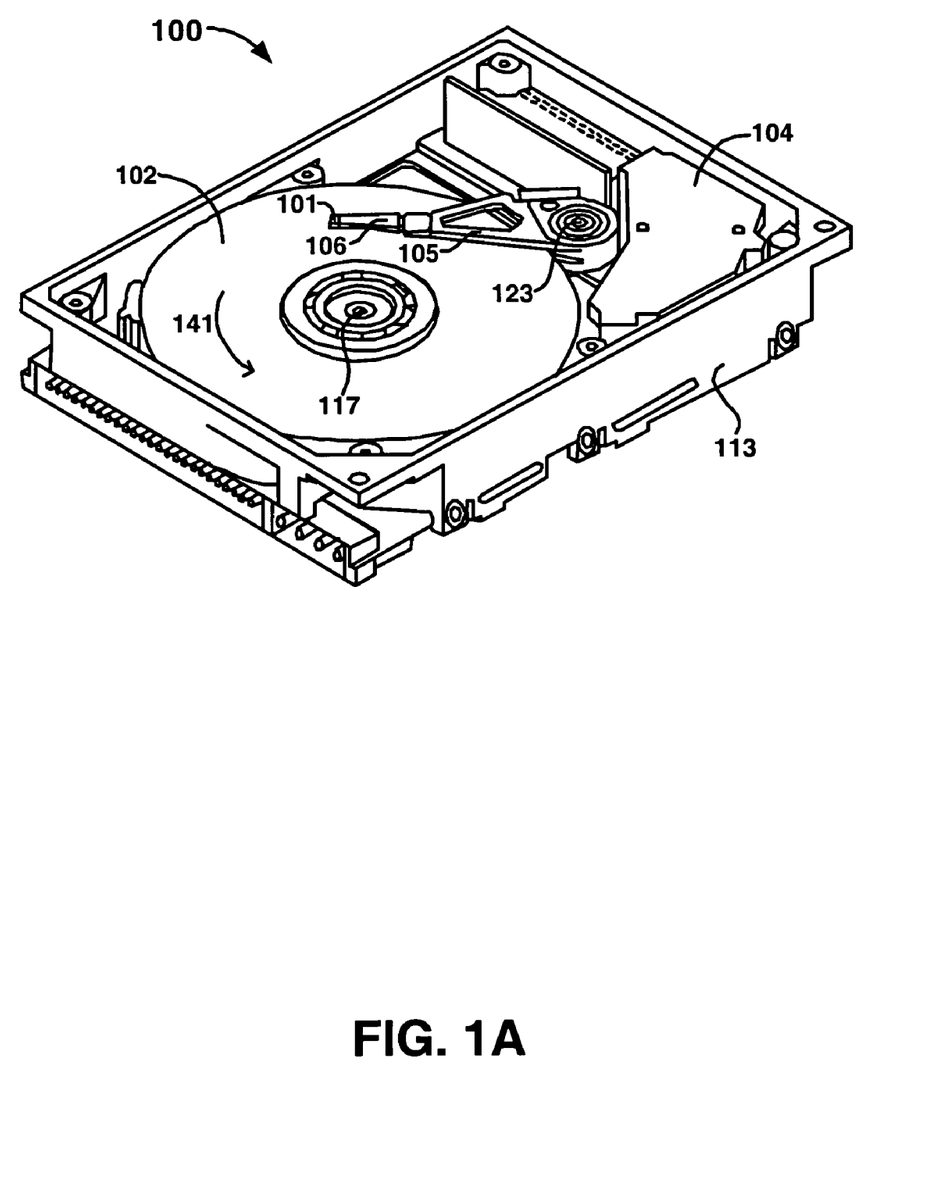
FIGS. 1A and 1B show components of a hard disk drive in accordance with embodiments of the present invention.

With reference now to FIG. 1A, a schematic drawing of one embodiment of a magnetic hard disk file or drive 100 for a computer system is shown. Drive 100 has a lower housing or base 113 containing a disk pack having at least one media or magnetic disk 102. It is noted that an upper housing (not shown) is typically coupled with housing 113 during normal operation of hard disk drive 100. The disk or disks 102 are rotated (see arrows 141) by a spindle motor assembly having a central drive hub 117. An actuator comprising a plurality of parallel actuator arms 105 (one shown) in the form of a comb that is movably or pivotally mounted to base 113 about a pivot assembly 123. A controller (not shown) is also mounted to base 113 for selectively moving the comb of arms 105 relative to disk 102.

In the embodiment shown, each arm 105 has extending from it at least one cantilevered load beam and suspension 106. A magnetic read/write transducer or head is mounted on a slider 101 and secured to a flexure that is flexibly mounted to each suspension 106. The read/write heads magnetically read data from and/or magnetically write data to disk 102. The level of integration called the head gimbal assembly (HGA) is head and the slider 101, which are mounted on suspension 106. The slider 101 is usually bonded to the end of suspension 106. The head is typically pico size (approximately 1245× 1000×300 microns) and formed from ceramic or intermetallic materials. The head also may be of "femto" size (approximately 850×700×230 microns) and is pre-loaded against the surface of disk 102 (in the range two to ten grams) by suspension 106.

Suspensions 106 have a spring-like quality, which biases or urges the air-bearing surface of the slider 101 against the disk 102 to cause the slider 101 to fly at a precise distance from the disk. A voice coil magnet assembly 104 is mounted to a lower housing 113 and is also mounted to arms 105 opposite the head gimbal assemblies. Movement of the voice coil magnet assembly 104 by the controller moves the head gimbal assemblies along radial arcs across tracks on the disk 102 until the read/write transducer is positioned above the desired data track. The head gimbal assemblies operate in a conventional manner and typically move in unison with one another, unless drive 100 uses multiple independent actuators (not shown) wherein the arms can move independently of one another.

Figure 1B:
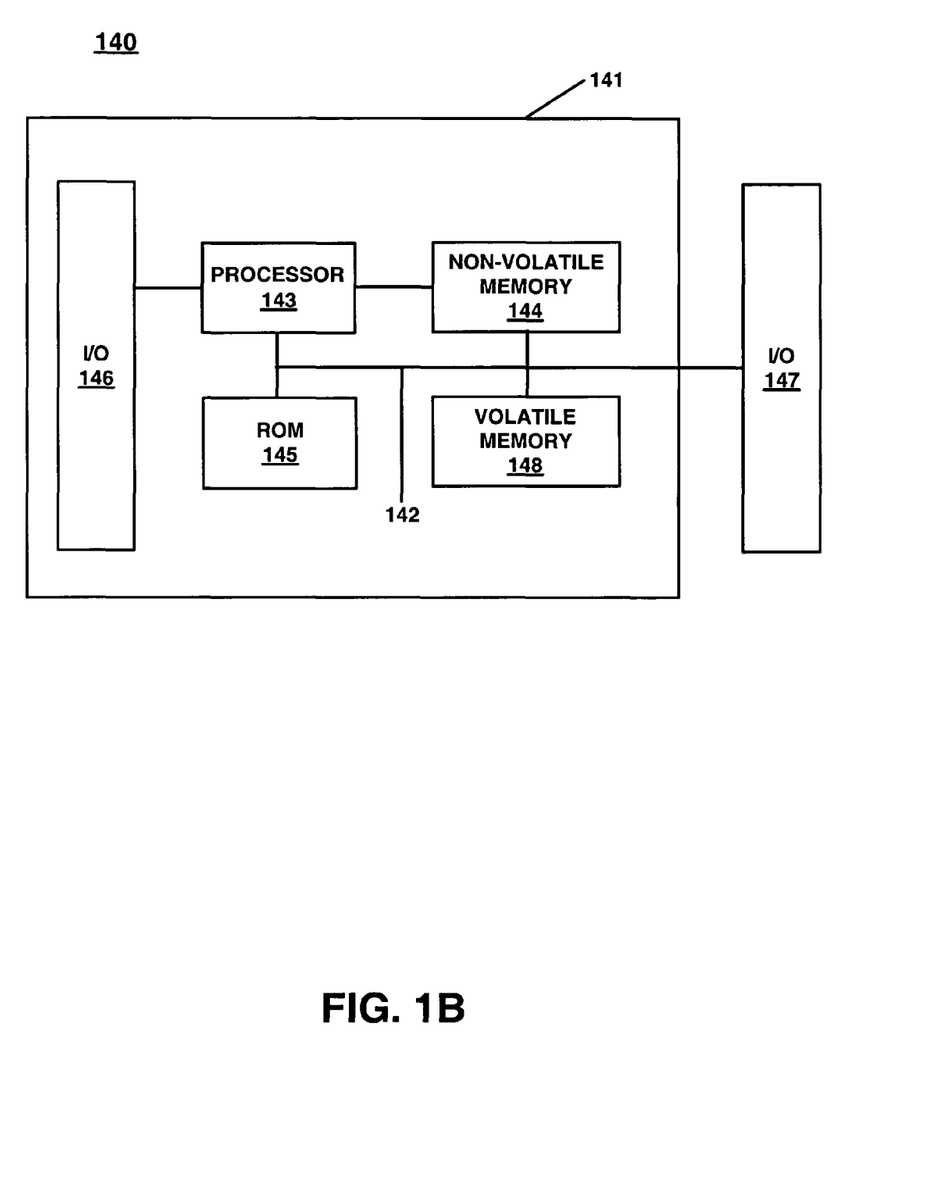

Drive 100 also comprises drive electronics card 140 which is used as an integrated controller in accordance with embodiments of the present invention. In FIG. 1B, a bus 142 is coupled with a processor 143. Processor 143 is for controlling the operation of hard disk drive 100. For example, processor 143 may be used for controlling the spindle motor used to rotate hard disks 102, control the actuator which positions arms 105, manage all read and write operations, implement power management and geometry translation, optimize multiple requests, manage internal cache and pre-fetch operations, etc. Processor 143 may be communicatively coupled with a non-volatile memory 144 (e.g., a flash memory device), a non-volatile read only memory (ROM) 145 for storing information and instructions used by processor 143, and a volatile memory 148. It is noted that in embodiments-of the present invention, ROM 145 may comprise a flash memory device. Alternatively, in embodiments of the present invention, the information and instructions typically stored in ROM 145 may be stored in non-volatile memory 144. Typically, volatile memory 148 may be used to cache data which is being written to, or read from, hard disk(s) 102.

Data is read and written to hard disk(s) 102 via an input/output interface (e.g., I/O 146) which is typically coupled to bus 142 via a read amplification circuit (not shown). A second input/output interface (e.g., I/O 147) is coupled with bus 142 and conveys data and instructions to and from a host computer system (not shown) to which hard disk drive 100 is coupled.

Figure 2:
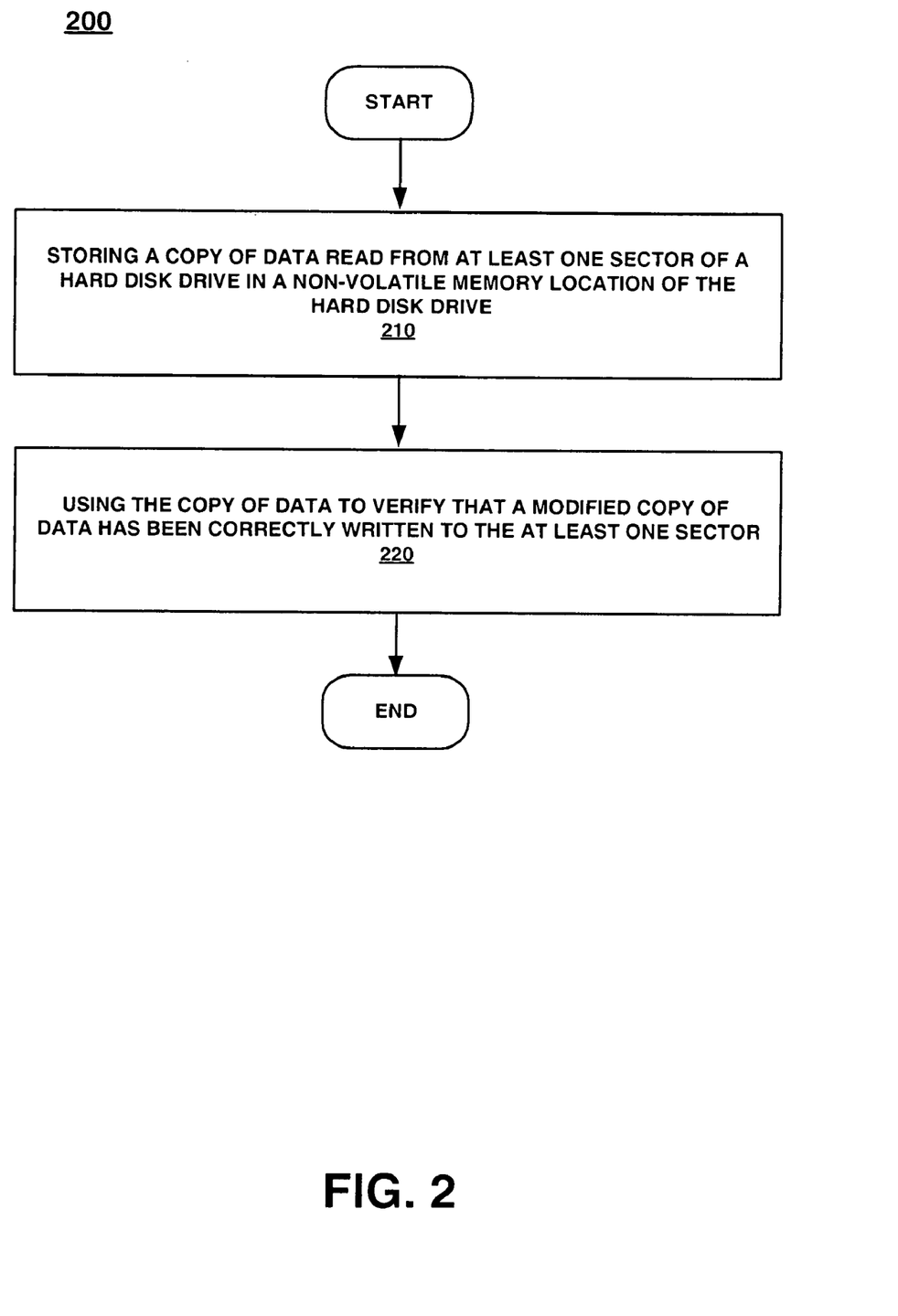
FIG. 2 is a flowchart of a method for preserving data on a hard disk drive in accordance with embodiments of the present invention.

FIG. 2 is a flowchart of a method 200 for preserving data on a hard disk drive in accordance with embodiments of the present invention. It is noted that method 200 describes a. read-modify-write operation which is performed by a single hard disk drive (e.g., 100). In step 210 of FIG. 2, a copy of data that is read from at least one sector of a hard disk drive is stored in a non-volatile memory location of the hard disk drive. For the purposes of the present invention, the term "sector" refers to the smallest contiguous unit of space on a hard disk which is accessed by the hard disk drive. In embodiments of the present invention, the non-volatile memory location may be upon the hard disk itself, or another non-volatile memory location of hard disk drive 100 (e.g., non-volatile memory 144). In embodiments of the present invention, multiple locations of hard disk 102 may be reserved for receiving copies of data. This is advantageous in that the data is stored in a location that is physically proximate to the original data.

In step 220 of FIG. 2, the copy of data that is stored in the non-volatile memory location is used to verify that a modified copy of data has been correctly written to the at least one sector. In embodiments of the present invention, when the modified data is successfully written into the sector previously accessed in step 210 above, the copy of data that is stored in the non-volatile memory location is either marked as being an invalid copy of data, or it is erased from that location.

Embodiments of the present invention advantageously facilitate writing data to hard disk drives in that they permit the restoration of the original data if a data overwrite is interrupted, particularly in an unaligned write operation. As will be described in greater detail below, while current systems provide for the recovery of data when the data being written to a sector comprises entirely new data (e.g., an aligned write operation), they do not provide data recovery when only a portion of the original data is being overwritten (e.g., an unaligned write operation).

In conventional hard disk drives, the use of volatile memory 148 as a read/write cache means that data stored therein will be lost if, for example, the computer system loses power. Thus, if part of the sector has already been overwritten in an unaligned write operation, when the power outage occurs the data cached in volatile memory 148 is lost and there is no provision with conventional systems to recover, or restore, the partially overwritten sector. Additionally, there may be no way to detect the data loss at all.

By using non-volatile memory (e.g., hard disk 102 and/or non-volatile memory 144) to store a copy of the data, embodiments of the present invention provide a system for recovering and restoring the original data in a sector which may be damaged as described above. Additionally, because the copy of data is marked as invalid, or erased, only after the modified data is written into the sector, embodiments of the present invention utilize the stored copy of data to indicate whether the modified has been successfully written to the sector.

Figure 3:
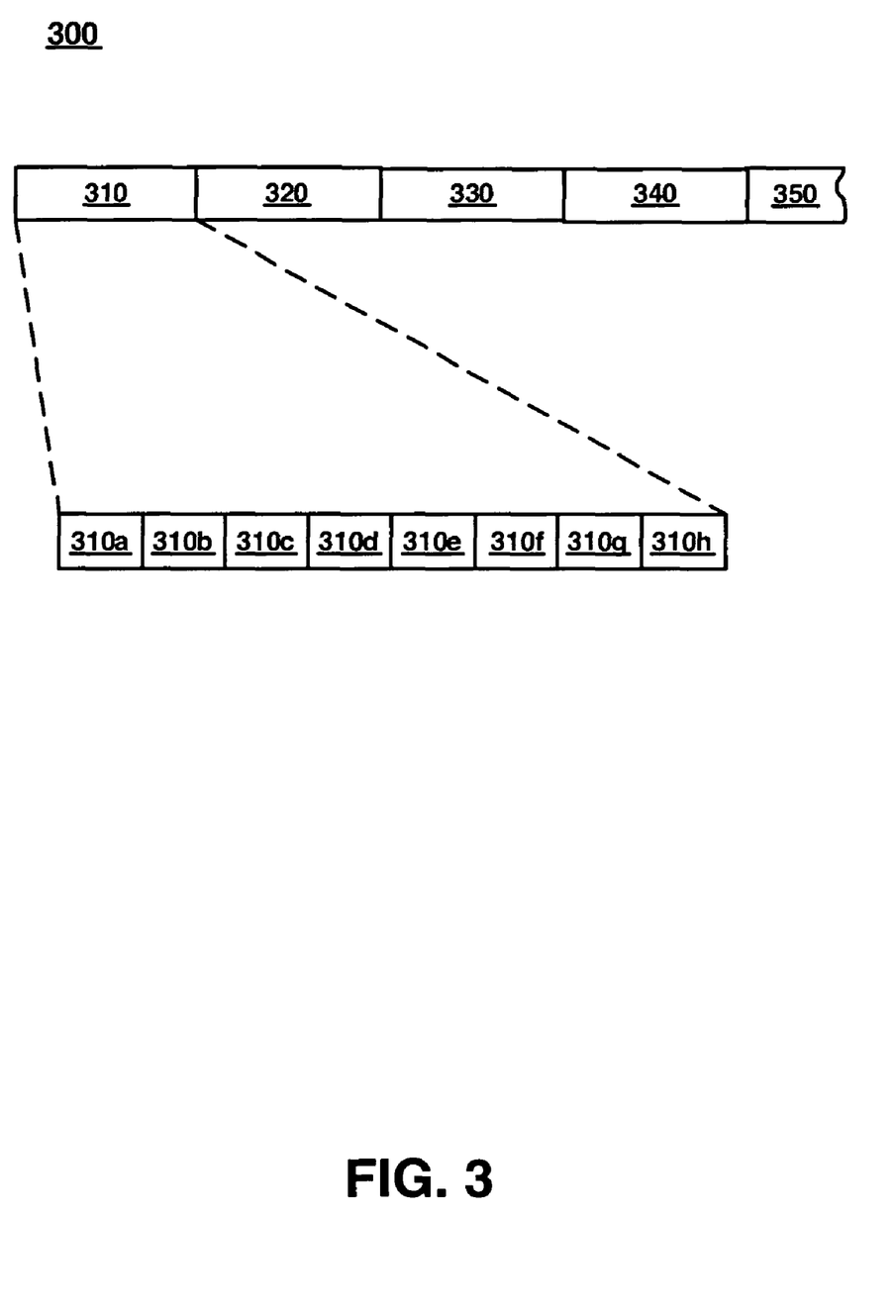
FIG. 3 is a block diagram showing the storage of data in sectors of a hard disk drive in accordance with embodiments of the present invention.

Referring now to FIG. 3, in embodiments of the present invention, data is stored on hard disk(s) 102 in sectors (e.g., 310, 320, 330, 340, and 350). In earlier implementations, a sector was typically 512 bytes in size. However, as discussed above, due to the larger capacities of hard disk drives, using sectors this small is now inconvenient. Thus, in embodiments of the present invention a sector (e.g., 310, 320, 330, 340, and 350) may be, but is not limited to, a size of 4096 bytes.

As described above, because some prior file systems cannot work with sectors larger than 512 bytes, each of the sectors (e.g., 310, 320, 330, and 340) may be divided into a plurality of logical data sectors (e.g., 310a, 310b, 310c, 310d, 310e, 310f, 310g, 310h) which are 512 bytes in order to be backward compatible with these file systems. As an example, even if the data in logical data sector 310f is the only data to be modified, the entire sector (e.g., 310) still must be read before the data in logical data sector 310f is modified, Then, the entire sector 310, including the modified data of logical data sector 310f, is written over the original data stored in sector 310. This is known as an unaligned write because rather than overwriting all of the data in sector 310 (e.g., beginning with logical data sector 310a and all of the other logical data sectors), only a portion of the data (e.g., logical data sector 310f) is overwritten. It is noted that an unaligned write operation could comprise more than one logical data sector (e.g., logical data sectors 310f, 310g, and 310h of sector 310) and may be performed upon more than one sector (e.g., sectors 310 and 330) depending upon the amount of data which has been modified from the original data. For example, if data in sectors 310, 320, and 330 are modified, it may occur that only some of the logical data sectors in sectors 310 and 330 are modified (e.g., an unaligned write operation) while all of the intervening logical data sectors in sector 320 are modified.

If a power outage, or other interruption, occurs when overwriting the original data in sector 310 with the modified data, there is no provision in conventional systems to recover or restore the data (either the original data or the modified data) because it is typically cached in a volatile memory device of the hard disk drive. However, in embodiments of the present invention, because a copy of the original data from sector 310 is stored in non-volatile memory 144, it can be used to restore the original data in sector 310 after power is restored to the host computer system.

Figure 4:
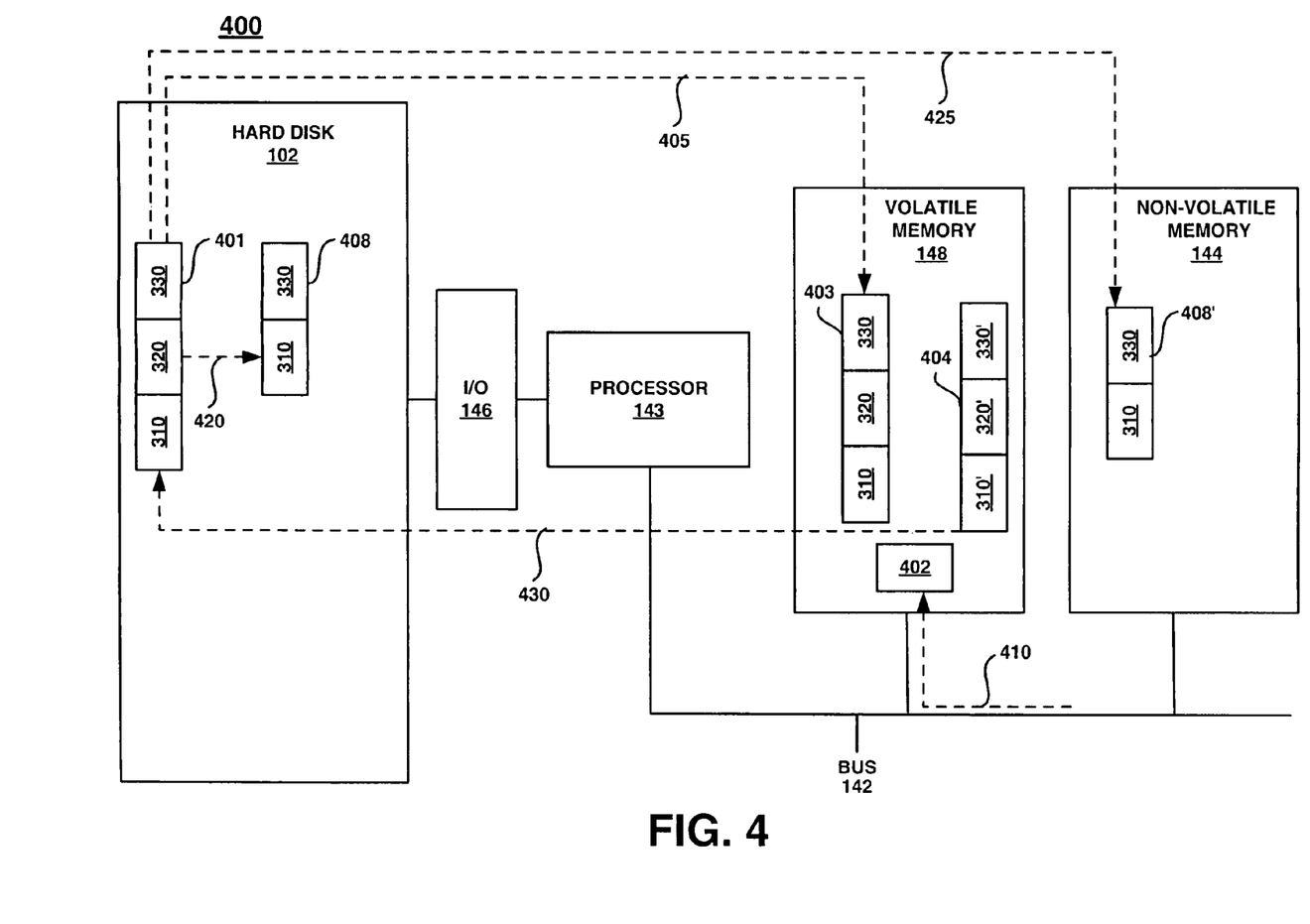
FIG. 4 shows an exemplary flow of data in accordance with embodiments of the present invention.

FIG. 4 shows an exemplary flow of data in accordance with embodiments of the present invention. In the embodiment of FIG. 4, the original data 401 comprising sectors 310, 320, and 330 is stored on hard disk 102. In event 405, a copy (e.g., 403) of original data 401 is cached in volatile memory 148 in response to a data read. In event 410, data 402 for modifying the original data is received by hard disk drive 110 via bus 142 and is also cached in volatile memory 148. Processor 143 also receives a command to modify or replace at least some of the original data 401 with the data 402, thus creating a modified copy of data 404 comprising sectors 310', 320', and 330'.

In the present embodiment, the data in sectors 310 and 330 is to be only partially overwritten (e.g., an unaligned write operation) when the original data 401 is overwritten by the modified copy of data 404. In response to the command to overwrite original data 401, a copy 408 of the original data of sectors 310 and 330 is stored at an alternative location of hard disk 102 as shown in FIG. 4 at event 420. Alternatively, copy 408' of the original data of sectors 310 and 330 may be stored in non-volatile memory 144 as shown in FIG. 4 at event 425. It is noted that in embodiments of the present invention, additional information, such as the location of hard disk 102 at which sectors 310 and 330 are originally located, may also be included with copy 408 and/or 408'.

After storing copy 408 on hard disk 102, or copy 408' in non-volatile memory 144, the modified copy of data 404 is created by modifying copy 403 with data 402. It is noted that while the present embodiment teaches that modified copy of data 404 is created after storing copy 408, or 408', in embodiments of the present invention, creating modified copy of data 404 may occur before storing copy 408, or 408'. Modified copy 404 is then stored on hard disk 102 in the physical location of original data 401, thus overwriting the original data 401 at event 430. Upon successfully writing the modified copy of data 404 over original data 401, copy 408 on hard disk 102, or copy 408' in non-volatile memory 144, is marked as being an invalid copy of sectors 310 and 330. Alternatively, copy 408 or copy 408' may be erased from hard disk 102 or non-volatile memory 144 upon successfully writing modified data 404 over original data 401.

If, however, power to the host computer system is interrupted when original data 401 is being overwritten by the modified copy of data 404, the data in sectors 310 and/or 330 may be lost or damaged. In embodiments of the present invention, copy 408, or 408', will therefore not be marked as an invalid copy and/or erased from hard disk 102 or non-volatile memory 144. Upon restoring power to the host computer system, processor 143 determines that copy 404, or 408', is a valid copy of sectors 310 and 330 and the data in these sectors can be restored to original data 401.

The preferred embodiment of the present invention, microjournaling of data oh a storage device, is thus described. While the present invention has been described in particular embodiments, it should be appreciated that the present invention should not be construed as limited by such embodiments, but rather construed according to the following claims.

What is claimed is:

1. A method for preserving data on a hard disk drive, said method comprising:
   storing a copy of previously stored data read from at least one sector of a hard disk in a non-volatile memory location of said hard disk drive, wherein said non-volatile memory location of said hard disk drive is separate from said hard disk;
   receiving a modified copy of data;
   storing said modified copy of data at said at least one sector of said hard disk thereby overwriting said previously stored data; and
   marking said copy of said previously stored data in said non-volatile memory location as invalid after verify that said modified copy of data has been successfully written to said at least one sector.

2. The method as recited in claim 1 further comprising:
   determining that said modified copy of data has not been successfully written to said at least one sector; and
   restoring said copy of said previously stored data in said at least one sector.

3. The method as recited in claim 1 further comprising:
   using said valid or invalid marking of said copy of said previously stored data to verify that said modified copy has been successfully written to said at least one sector.

4. The method as recited in claim 1 wherein said method further comprises:
   storing an indication of the location of said at least one sector with said copy of said previously stored data.

5. The method as recited in claim 1 further comprising:
   receiving a command to perform an unaligned write operation to said at least one sector; and
   reading said copy of said previously stored data from said hard disk.

6. A system for preserving data on a hard disk drive, said system comprising:
   a housing;
   a disk pack mounted to said housing and comprising at least one hard disk that is rotatable relative to said housing, the disk pack defining an axis of rotation and a radial direction relative to the axis;
   a non-volatile memory mounted to said housing which is separate from said at least one hard disk; and
   a controller mounted to said housing, said controller comprising a non-volatile memory which is separate from said at least one hard disk, said controller further for implementing a method for preserving data on a hard disk drive, said method comprising:
      storing a copy of previously stored data read from at least one sector of a hard disk in a non-volatile memory location of said hard disk drive, wherein said non-volatile memory location of said hard disk drive is separate from said hard disk;
      receiving a modified copy of data;

storing said modified copy of data at said at least one sector of said hard disk thereby overwriting said previously stored data; and marking said copy of said previously stored data in said non-volatile memory location as invalid after verifying that said modified copy of data has been successfully written to said at least one sector.

7. The system of claim 6 wherein said method further comprises:

determining that said modified copy of data has not been successfully written to said at least one sector; and restoring said copy of said previously stored data in said at least one sector.

8. The system of claim 6 further comprising:

using said valid or invalid marking of said copy of said previously stored data to verify that said modified copy has been successfully written to said at least one sector.

9. The system of claim 6 wherein said method further comprises:

storing an indication of the location of said at least one sector with said copy of said previously stored data.

10. The system of claim 6 wherein said method further comprises:

receiving a command to perform an unaligned write operation to said at least one sector; and reading said copy of said previously stored data from said hard disk.

11. A hard disk drive system comprising:

a disk pack comprising at least one hard disk;

a storage means for storing a copy of previously stored data read from at least one sector of said disk pack, wherein said non-volatile memory location of said hard disk drive is separate from said hard disk;

a receiving means for receiving a modified copy of data and storing said modified copy of data at said at least one sector of said hard disk thereby overwriting said previously stored data; and a controlling means for marking said copy of said previously stored data in said non-volatile memory location as invalid after verifying that said modified copy of data has been successfully written to said at least one sector.

12. The hard disk drive system of claim 11 wherein said controlling means is further for restoring said copy of said previously stored data to said at least one sector in response to determining that said modified copy of said data has not been successfully written to said at least one sector.

13. The hard disk drive system of claim 11 wherein said controlling means is further for erasing said copy of said previously stored data when said modified copy has been successfully written to said at least one sector.

14. The hard disk drive system of claim 11 wherein said storage means is further for storing an indication of the location of said at least one sector with said copy of said previously stored data.

* * * * *

UNITED STATES PATENT AND TRADEMARK OFFICE
CERTIFICATE OF CORRECTION

| | | |
|---|---|---|
| PATENT NO. | : 7,986,480 B2 | Page 1 of 1 |
| APPLICATION NO. | : 11/265826 | |
| DATED | : July 26, 2011 | |
| INVENTOR(S) | : Daniel J. Colegrove and Richard M. H. New | |

It is certified that error appears in the above-identified patent and that said Letters Patent is hereby corrected as shown below:

Col. 6, Line 27, Claim 1: Delete "verify"
and insert -- verifying --

Signed and Sealed this
Twenty-seventh Day of September, 2011

David J. Kappos
*Director of the United States Patent and Trademark Office*